(12) United States Patent
Blondel et al.

(10) Patent No.: US 6,480,764 B2
(45) Date of Patent: Nov. 12, 2002

(54) FLIGHT CONTROL INDICATOR FOR AN AIRCRAFT, INTENDED TO SUPPLY THE ENGINE PRESSURE RATIO

(75) Inventors: Francis Blondel, Dieppe (FR); Rudiger Thomas, Cornebarrieu (FR)

(73) Assignee: EADS Airbus, S.A., Paris (FR)

( * ) Notice: Subject to any disclaimer, the term of this patent is extended or adjusted under 35 U.S.C. 154(b) by 51 days.

(21) Appl. No.: 09/766,586

(22) Filed: Jan. 23, 2001

(65) Prior Publication Data

US 2002/0072831 A1 Jun. 13, 2002

(30) Foreign Application Priority Data

Dec. 13, 2000 (FR) .............................................. 00 16234

(51) Int. Cl.⁷ .......................... G01D 7/00; B64D 43/00
(52) U.S. Cl. .......................... 701/3; 340/451; 340/945; 340/963; 244/1 R
(58) Field of Search .............................. 701/3; 340/963, 340/945, 451; 244/1 R

(56) References Cited

U.S. PATENT DOCUMENTS 5,404,766 A * 4/1995 Thomas ...................... 340/959
5,668,542 A * 9/1997 Wright ........................ 340/945
5,815,072 A * 9/1998 Yamanaka et al. .......... 340/438
6,118,385 A * 9/2000 Leard et al. ................. 340/441

FOREIGN PATENT DOCUMENTS

| DE | 3315386 | 10/1984 |
|---|---|---|
| FR | 2731069 | 8/1996 |
| WO | 9742466 | 11/1997 |
| WO | WO 0065423 A2 * | 11/2000 |

* cited by examiner

Primary Examiner—Michael J Zanelli
Assistant Examiner—Eric M Gibson
(74) Attorney, Agent, or Firm—Stevens, Davis, Miller & Mosher, LLP

(57) ABSTRACT

A flight control indicator for an aircraft, intended to supply the engine pressure ratio, includes acquisition and processing units (2, 3) which determine the actual value of the engine pressure ratio and a display unit (4) provided with a dial (6) and with a needle (7) whose position on the dial (6) corresponds to the actual value of the engine pressure ratio. Moreover, the acquisition and processing units (2, 3) determine minimum and maximum values for the engine pressure ratio, and the display unit (4) presents on the dial (6) a circular sector (8) which is delimited by two radii (8A, 8B) whose positions correspond respectively to the minimum and maximum values for the engine pressure ratio.

6 Claims, 2 Drawing Sheets

FLIGHT CONTROL INDICATOR FOR AN AIRCRAFT, INTENDED TO SUPPLY THE ENGINE PRESSURE RATIO

FIELD OF THE INVENTION

The present invention relates to a flight control indicator for an aircraft, intended to supply the engine pressure ratio of an engine of the aircraft.

Within the framework of the present invention, the expression engine pressure ratio is understood to mean the ratio between the pressures at the inlet and at the outlet of the engine, which is known in aeronautical language by the abbreviation EPR.

BACKGROUND OF THE INVENTION

It is known that a flight control indicator of this type generally includes:

means for acquiring and for processing information which determine in real time the actual value of the engine pressure ratio; and display means which present on a display screen the engine pressure ratio, the display screen being provided with a dial graduated in values of the engine pressure ratio and with a needle whose position on the dial corresponds to the actual value of the engine pressure ratio.

Moreover, the maximum value of the engine pressure ratio is generally signaled by a particular symbol envisaged on the dial.

With such a flight control indicator, pilots often have great difficulties in evaluating the actual level of the thrust delivered by the engine in intermediate regimes, in particular on the approach to a runway.

These difficulties are heightened by the fact that the EPR ratio exhibits large variations of its maximum and minimum limits, as a function of the flight conditions and in particular as a function of the Mach number, of the altitude and of the outside temperature.

To alleviate this deficit of information, pilots often resort to the information supplied by a parameter indicator N1 (speed of rotation of the low-pressure module) of the engine. Such a known indicator N1, which can easily be read and understood, gives pilots an information item (speed of rotation) enabling them to better evaluate the level of thrust delivered by the engine.

However, this standard solution is not satisfactory since it requires the monitoring of two different indicators and the simultaneous checking of two types of information.

SUMMARY OF THE INVENTION

The present invention relates to a flight control indicator intended to supply the engine pressure ratio, making it possible to remedy these drawbacks.

Accordingly, the indicator of the type comprising;

means for acquiring and for processing information which determine in real tine the actual value of the engine pressure ratio; and display means which present on a display screen the engine pressure ratio, the display screen being provided with a dial graduated in values of the engine pressure ratio and with a needle whose position on the dial corresponds to the actual value of the engine pressure ratio, is noteworthy according to the invention in that the means for acquiring and for processing information moreover determine in real time minimum and maximum values for the engine pressure ratio, and in that the display means moreover present on the dial a circular sector, of variable amplitude and position, which is differentiated from the background of the dial and which is delimited by two radii whose positions on the graduated dial correspond respectively to the minimum and maximum values of the engine pressure ratio.

Thus, by virtue of the invention, the circular sector, that is to say the domain of possible values for the engine pressure ratio EPR between the minimum and maximum values is continuously indicated in real time, thereby rendering the variations of the domain of values clearer to the pilots and above all supplying them with a visual and intuitive readout of the actual thrust level delivered by the engine.

Moreover, by virtue of the invention, there is good differentiation between the presentations of the actual value of the EPR ratio (displayed by the needle which makes it possible to give an accurate indication of this value) and of the domain of possible values of this EPR ratio (displayed by the circular sector which gives an overall visual indication of this domain of values). Thus, the indicator can easily be read and the various information items can be properly distinguished from one another.

Within the framework of the present invention, the expression circular sector is obviously understood to mean a part of a disk which is bounded by two radii (which respectively illustrate the minimum and maximum values of the engine pressure ratio EPR).

Advantageously, the display means are formed in such a way as to present the circular sector only when the corresponding engine is operational.

Thus, the disappearance of the circular sector from the dial makes it possible to signal to the pilots, in a simple and effective manner, a fault with the engine or the switch to degraded mode (when the information making it possible to calculate the EPR ratio is not available) or the switch to "reverse" mode (thrust reversers deployed).

Furthermore, advantageously, the circular sector exhibits a color (gray for example) which in different from that of the background of the dial.

Additionally, advantageously, the means for acquiring and for processing information comprise a full authority control system for the engine of the FADEC type, which supplies the minimum and maximum values of the engine pressure ratio.

Furthermore, advantageously, the display means moreover present on the display screen a symbol, whose position on the graduated dial corresponds maximum value of the engine pressure ratio.

BRIEF DESCRIPTION OF THE DRAWINGS

The Figures of the appended drawings will elucidate the manner in which the invention may be embodied. In these Figures, identical references denote similar elements.

DETAILED DESCRIPTION OF THE PREFERRED EMBODIMENTS

Figure 1:
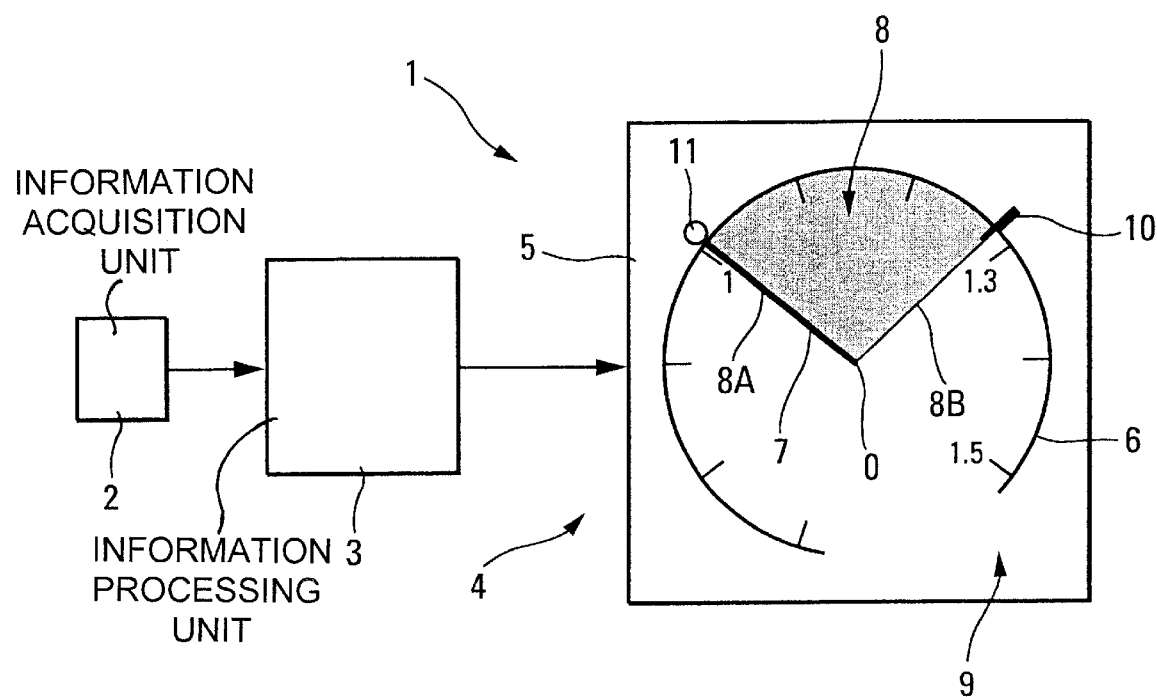
FIG. 1 is the schematic diagram of a flight control indicator in accordance with the invention.

The flight control indicator 1 in accordance with the invention and represented diagrammatically in FIG. 1 is intended to supply on an aircraft, in particular a civil transport aircraft, the engine pressure ratio (EPR ratio) of an engine of the aircraft.

Accordingly, the indicator 1 comprises in a known manner:

means 2 for acquiring information and means 3 for processing information which determine in real time the actual value of the engine pressure ratio EPR; and display means 4 which present on a display screen 5 the engine pressure ratio EPRt Accordingly, this display screen 5 is provided with a dial 6 in the shape of a disk which is graduated in values of the engine pressure ratio and with a needle 7 which turns about a point O, the center of the dial 6, whose position on the dial 6 indicates the actual value of the engine pressure ratio EPR.

According to the invention:

the means 2 and 3 moreover determine in real time minimum and maximum values for the EPR ratio; and the display means 4 moreover present on the dial 6 a circular sector 8, of variable amplitude and position, which is differentiated from the background 9 of the dial 6 and which is delimited on the graduated dial 6 by two radii 8A and 8B whose positions correspond respectively to the minimum and maximum values of the EPR ratio.

Thus, by virtue of the invention, the circular sector 8, that is to say the domain of possible values for the engine pressure ratio EPR (between the minimum and maximum values) is continuously indicated in real time, thereby rendering the variations of the domain of values clearer to the pilots and above all supplying them with a visual and intuitive readout of the actual thrust level delivered by the engine.

Moreover, by virtue of the invention, there is good differentiation between the presentations of the actual value of the ERR ratio (displayed by the needle 7 which makes it possible to give an accurate indication of this value) and of the domain of possible values of this EPR ratio (displayed by the circular sector 8 which gives an overall visual indication of this domain of values). Thus, the indicator 1 can easily be read and the various information items (EPR ratio and domain of values), although presented on the same dial 6, are easily distinguishable from one another.

According to the invention, the display means 4 are formed in such a way as to present the circular sector 8 only when the corresponding engine is operational.

Consequently, the disappearance on the dial 6 of a previously present circular sector 8 makes it possible to signal to the pilots of the aircraft, in a simple and effective manner, the fault of the engine.

To differentiate the circular sector 8 from the background 9, the circular sector 8 exhibits, for example, a color or a shading which is different from that of the background 9.

The display screen 5 moreover comprises on the graduated dial 6:

a particular symbol 10, for example amber in color, whose position on the dial 6 illustrates the maximum value of the EPR ratio. This symbol 10 is therefore continually aligned with the edge radius 8B of the circular sector 8; and a symbol 11, for example a blue ring, which indicates the value of the EPR ratio corresponding to the position of the throttle.

It will be noted that the means 3 determine the minimum and maximum values of the EPR ratio, in a known manner, as a function of the aircraft's flight phases. Generally, they determine these values, in particular as a function of the Mach number, of the altitude of the aircraft and of the outside temperature.

In a preferred embodiment, these values emanate from a standard full authority control system for the engine, that is to say from a monitoring system of the FADEC ("Full Authority Digital Engine Control") type.

Figure 2:
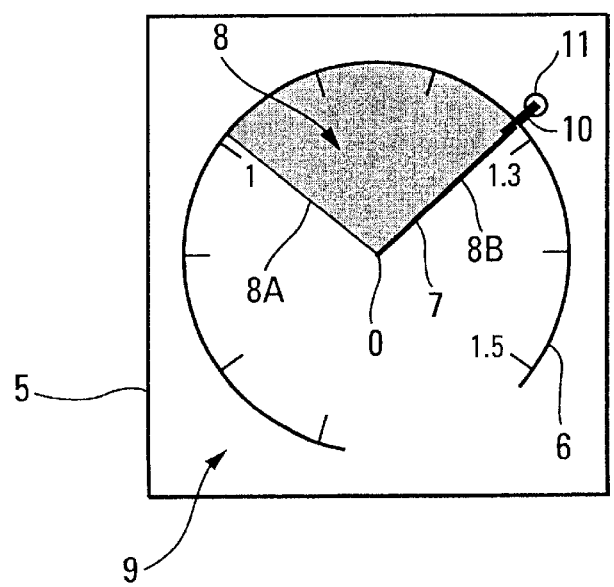
FIGS. 2 to 6 illustrate the display screen of a flight control indicator in accordance with the invention for various phases of flight of the aircraft.
Figure 3:
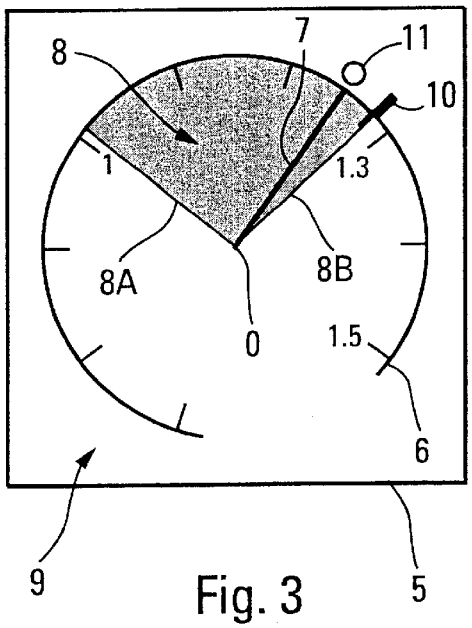
Figure 5:
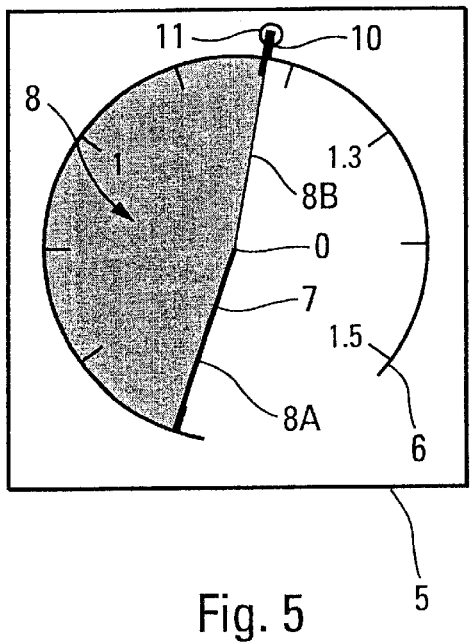
Figure 6:
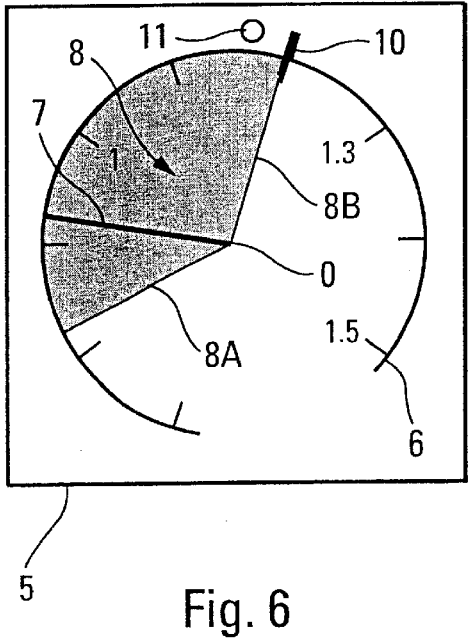

By way of illustration, represented in FIGS. 1 to 6 is the information supplied in accordance with the invention by the display screen 5, for various phases of flight of the aircraft (not represented) equipped with the indicator 1. In this illustration, these flight phases correspond respectively to the positions of the aircraft and for which it is:

idling on the ground (FIG. 1);

taking off (FIG. 2);

climbing (FIG. 3);

cruising (FIG. 4):

idling at the start of the descent (FIG. 5); and on the approach (FIG. 6).

Figure 4:
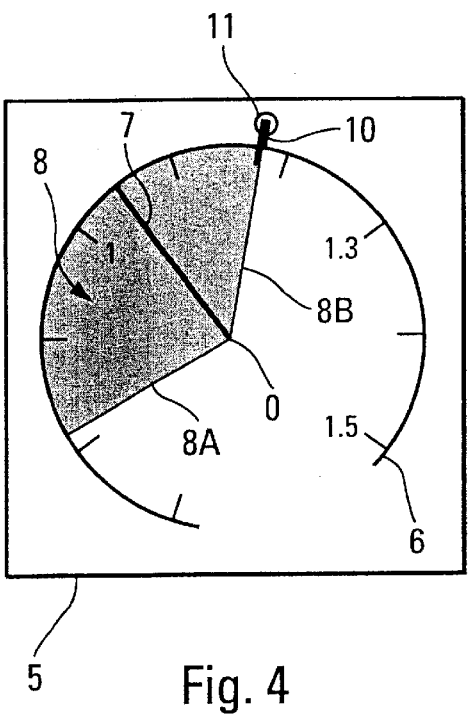

It will be noted by way of illustration that, in FIGS. 3, 4 and 5 for example, the circular sector 8 presents different positions and amplitudes on each occasion. Of course, the position of the circular sector 8 is defined by the position of the two radii 8A and 8B and its amplitude is defined by the angular gap between these two radii 8A and 8B.

What is claimed is:

1. A flight control indicator for an aircraft, intended to supply an engine pressure ratio of an engine of the aircraft, said flight control indicator comprising:

means for acquiring and for processing information which determine in real time an actual value of the engine pressure ratio; and display means which present on a display screen said engine pressure ratio, said display screen being provided with a dial graduated in values of the engine pressure ratio and with a needle whose position on said dial corresponds to said actual value of the engine pressure ratio, wherein said means for acquiring and for processing information moreover determine in real time minimum and maximum values for said engine pressure ratio, and wherein said display means moreover present on said dial a circular sector, of variable amplitude and position, which is differentiated from a background of the dial and which is delimited by two radii whose positions on said graduated dial correspond respectively to said minimum and maximum values of the engine pressure ratio.

2. The flight control indicator as claimed in claim 1, wherein said display means are formed in such a way as to present said circular sector only when said engine is operational.

3. The flight control indicator as claimed in claim 1, wherein said circular sector exhibits a color which is different from that of the background of the dial.

4. The flight control indicator as claimed in claim 1, wherein said circular sector is gray.

5. The flight control indicator as claimed in claim 1, wherein said means for acquiring and for processing said information comprise a full authority control system for the engine, which supplies said minimum and maximum values of the engine pressure ratio.

6. The flight control indicator as claimed in claim 1, wherein said display means moreover present on said display screen a symbol, whose position on said graduated dial corresponds to said maximum value of said engine pressure ratio.

* * * * *